Patented Dec. 29, 1925.

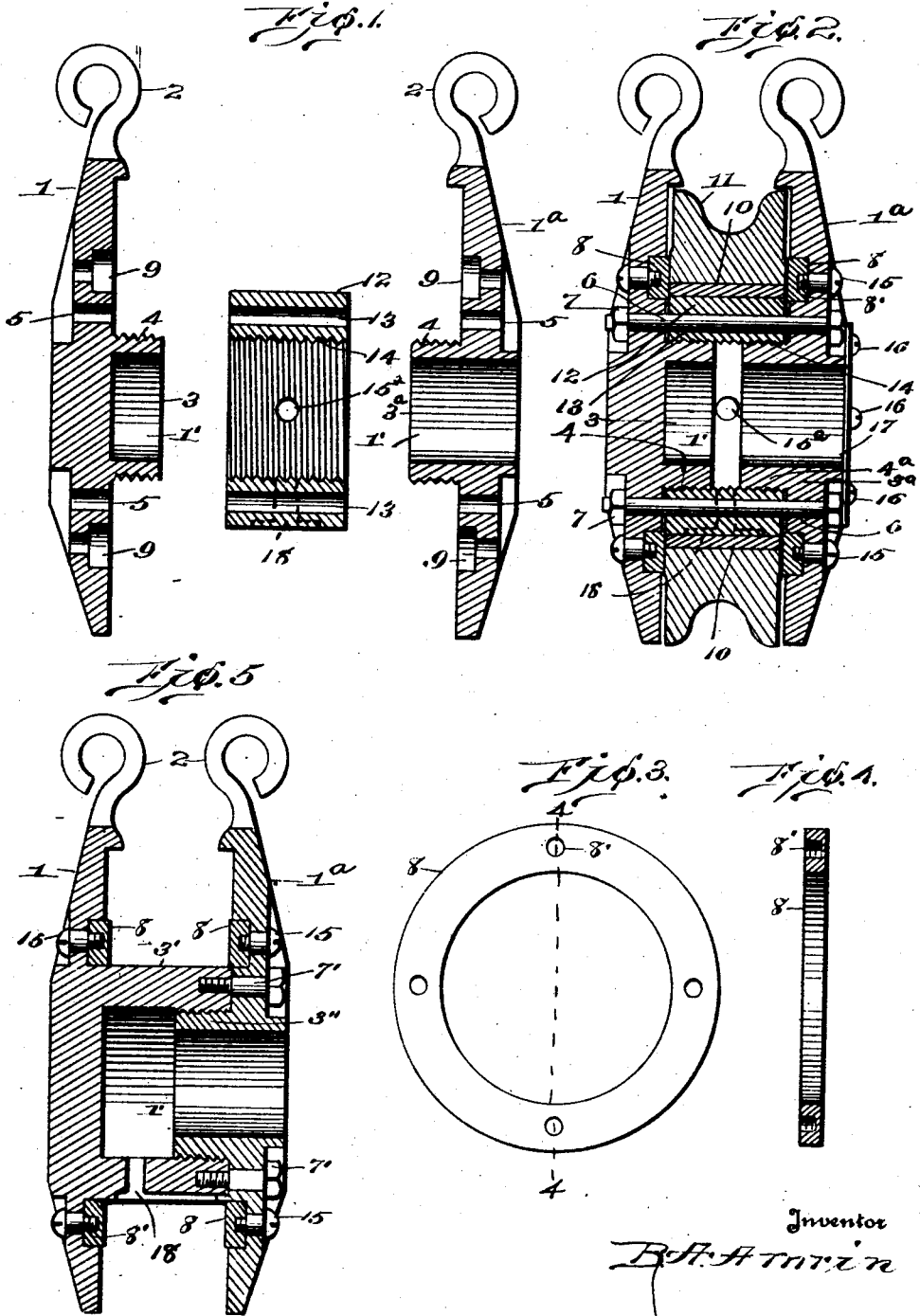

1,567,694

UNITED STATES PATENT OFFICE.

BEN A. AMRIN, OF BUCODA, WASHINGTON.

TACKLE BLOCK.

Application filed January 19, 1925. Serial No. 3,439.

*To all whom it may concern:*

Be it known that I, BEN A. AMRIN, a citizen of the United States, residing at Bucoda, in the county of Thurston and State of Washington, have invented certain new and useful Improvements in Tackle Blocks, of which the following is a specification.

My invention relates to tackle-blocks, and more especially to that type known as self-lubricating.

The primary object is to provide a tackle-block in which the shell and sheave are protected from sidewise wear.

Other objects are to provide a self-lubricating tackle-block that is capable of prompt and easy assembly, exceptionally durable, economical to manufacture and use, of noiseless operation, and in which the working parts are kept free from dust and the elements.

To accomplish these objects, I have provided a tackle-block the shell of which is in two nearly equal parts each containing a screw-threaded hub the interiors of which cooperate to form an oil compartment, joined by a threaded sleeve which is also a radial bearing, the shell-parts grooved to contain thrust bearing rings, and a conduit leading from the oil compartment to the wearing parts. In a slight modification, I have also provided a type of tackle-block in which the hubs are screw-threaded in such fashion as to fit one into the other and form a radial bearing, thus eliminating the screw-threaded sleeve hereinabove mentioned.

In the drawings, Figure 1 is a vertical section showing portions of the device unassembled; Figure 2 is a similar view of the complete device, assembled; Figure 3 is side elevation of the thrust bearing rings; Figure 4 is a vertical section, on lines 4—4 of Figure 3; and Figure 5 is a vertical section showing a slight modification of the type shown in Figures 1 and 2.

The numerals 1 and $1^a$ represent the legs or sides of the shell, 2 supporting-hooks, 3 and $3^a$ hubs, 4 a screw-thread on 3, 5 bolt-holes, 6 bolts, 7, 7' nuts, 8 thrust bearing rings, 8' threaded screw-holes in 8, 9 groove for 8, 10 bushing, 11 sheave, 12 radial bearing, 13 bolt-hole in 12, 14 screw-threads in 12, 15 retaining-screws for 8, $15^a$ oiling perforations, 16 screws in 17, and 18 oil conduit.

To assemble the parts herein described, the leg 1 is supplied with the thrust-bearing 8 placed in the groove 9 and retained by the screws 15; the threaded radial bearing 12 is next turned into place on the hub 3, the bushing 10 and the sheave 11 slipped into place on said bearing; then the leg $1^a$ (its groove 9 similarly fitted with its bearing 8) is turned into the radial bearing ring 12, the bolts 6 inserted and secured by the nuts 7; the oil compartment (in the hollow hubs 3, $3^a$) filled with lubricant and the cap 17 fastened on by the little screws 16.

The holes $15^a$ with which the bearing 12 is perforated, allow the feeding of lubricating material through the conduit 18 with its enlarged orifice, to all of the working parts.

Thus assembled, the block is capable of use with a minimum of friction and noise, and also of long-continued use without further attention or oiling, although the renewal of the lubricant (when finally required) is conveniently accomplished by removing the screws 16 from the plate 17. In the modified form (Figure 5) the lubricant is renewed after loosening the screws 7' and separating the two sections 1 and $1^a$ of the shell.

The thrust bearing rings 8 furnish durable surfaces upon which the radial bearing 12 bears laterally, and their constant lubrication prevents any sidewise wear that might cause a grinding of the parts and the consequent noisy action of the tackle-block. If desired, the screws 15 may be omitted and the rings 8 be allowed to rotate, thus adding to the radial action of the device.

Further modifications may be made without departing from the principles of my invention.

What I claim and desire to secure by Letters Patent are:

1. A tackle-block comprising a shell in two parts each containing a threaded hub, a means for connecting said hubs, a radial bearing threaded upon said hubs, and a sheave encircling said radial bearing.

2. A tackle-block comprising a shell in two parts each containing a threaded hub, means for connecting said hubs, a radial bearing threaded upon said hubs, thrust-bearing rings mortised in each of said shell parts, and a sheave encircling said radial bearing.

3. A tackle-block comprising a shell in two parts each containing a threaded hub, means for connecting said hubs, a radial bearing threaded upon said hubs, thrust-bearing rings mortised in each of said shell parts, said hubs hollowed to form an oil compartment, a conduit from said oil compartment to the working parts, and a sheave encircling said bearing ring.

In testimony whereof I have hereto affixed my signature.

BEN A. AMRIN.